Nov. 28, 1933.   V. DUDICK   1,937,404
ALTERNATING CURRENT MACHINE AND SYSTEM OF CONTROL THEREFOR
Filed Sept. 9, 1932   5 Sheets-Sheet 1

Inventor
Victor Dudick,
By
Attorney

Nov. 28, 1933.   V. DUDICK   1,937,404
ALTERNATING CURRENT MACHINE AND SYSTEM OF CONTROL THEREFOR
Filed Sept. 9, 1932   5 Sheets-Sheet 2

Inventor
Victor Dudick,
By
Attorney

Nov. 28, 1933.  V. DUDICK  1,937,404
ALTERNATING CURRENT MACHINE AND SYSTEM OF CONTROL THEREFOR
Filed Sept. 9, 1932   5 Sheets-Sheet 3

Victor Dudick, Inventor

By

Attorney

Nov. 28, 1933.  V. DUDICK  1,937,404
ALTERNATING CURRENT MACHINE AND SYSTEM OF CONTROL THEREFOR
Filed Sept. 9, 1932   5 Sheets-Sheet 5

Inventor
Victor Dudick,
By
Attorney

Patented Nov. 28, 1933

1,937,404

UNITED STATES PATENT OFFICE 1,937,404

ALTERNATING CURRENT MACHINE AND SYSTEM OF CONTROL THEREFOR

Victor Dudick, North Belle Vernon, Pa., assignor of one-third to John E. Coughenour and one-third to Louis J. Vezzani, both of North Belle Vernon, Pa.

Application September 9, 1932. Serial No. 632,411

10 Claims. (Cl. 172—274)

This invention relates to alternating current machines and systems of control therefor. An object of the invention is to provide an A. C. polyphase wound rotor induction motor equipped with the usual operating windings and a separate winding of high resistance located on the rotor of the motor, and designed to be connected to the line circuit to operate as a braking winding in bringing the motor and its connected load to a stop and also to hold the rotor stationary.

Another object is to provide a control system for a polyphase wound rotor motor having a controller connected to the line circuit for starting the motor in either direction, accelerating means for the motor, and provided with separate contacts to connect the usual rotor winding to the line circuit in such a manner as to cause polarization of both the stator and rotor for stopping the motor and holding the rotor in locked position.

A further object is to provide a polyphase wound rotor motor control system including a controller provided with contacts and connected to the line circuit for starting the motor in either direction, contacts for accelerating the motor by decreasing the slip resistance in the rotor circuit and also provided with contacts for reversing the rotating magnetic field and inserting a high resistance in the rotor circuit when the controller is moved to braking position. This operation brings the motor to a stop and also keeps the rotor from rotating in its previous direction.

It is also an object to equip a polyphase induction motor with a double wound stator and a control system including a controller for connecting both stator windings to the line circuit for starting the motor in either direction and also provided with contacts for reversing one stator winding so as to produce a bucking magnetic field within the stator core for slowing down and stopping the rotor.

A further object is to provide a wound rotor polyphase motor and a controller having means for connecting the line circuit to the rotor winding in reversed phase relation to the stator winding to produce a polarized effect between the stator and rotor in order to develop a braking torque on the rotor.

A further object is to provide a wound rotor polyphase induction motor with two rotor windings one being the usual secondary winding and the other the high resistance winding open circuited during normal operation and connected to the line circuit for braking service.

A further object is to provide a wound rotor polyphase motor having a high resistance to be inserted in the secondary winding upon slowing down of the rotor and reversal of the stator winding to provide a braking effect on the rotor and prevent starting up in the reverse direction of rotation.

Referring to the drawings.

In all of the figures of the drawings the usual slip-rings for the rotor are omitted. The windings illustrated are star windings although delta windings may be employed with equally good results. Both the stator and rotor windings are of the usual four pole three phase type although the invention is, of course, not limited to four pole motors since any number of poles may be employed as is customary, provided the rotor and stator both have the same number of poles. Also the invention is not limited to three phase type of motors as any number of phases may be used as long as the polarity characteristics in the stator and rotor are maintained. In connection with the winding arrangements shown in Figs. 7 and 8 squirrel cage windings may be employed on the rotor.

Figure 2:
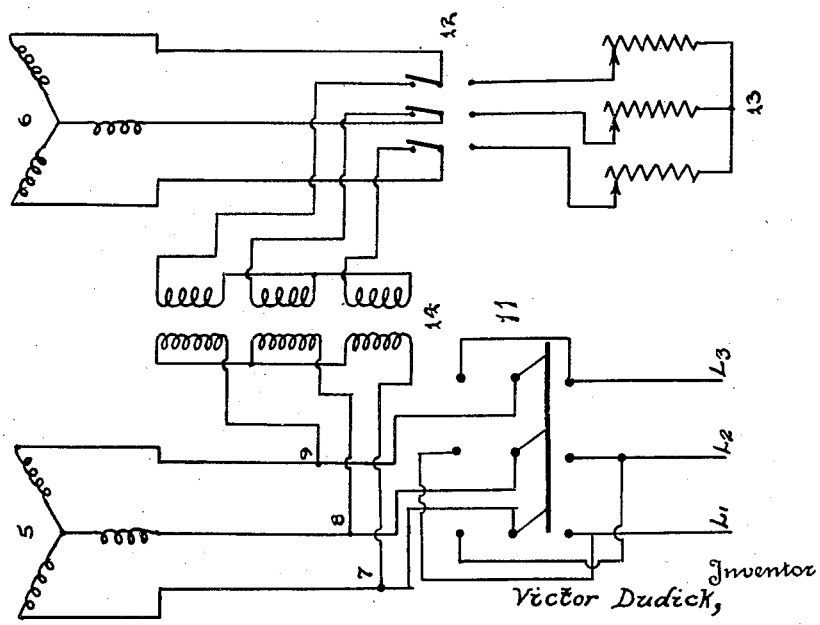
Fig. 2 is a diagram showing connections for connecting the secondary winding to the line circuit through a step-down transformer for braking purposes and also showing means for connecting a resistance in the secondary circuit.

For convenience of description reference will be had first to Fig. 2 in which the stator winding 5 is connected to the line circuit $L_1$, $L_2$, $L_3$ through the reversing switch 11. The rotor winding 6 may be connected by means of reversing switch 12 to the secondary resistance 13 or to the line circuit through the step-down transformer 14. It will be noted that the primary of the transformer is connected at 7, 8 and 9 between the reversing switch 11 and the stator winding 5. In the normal operation of the system shown in Fig. 2 the switch 12 is connected to the resistance 13 which resistance is controlled in the usual manner for accelerating the motor. In order to slow down and stop the motor the switch 12 is thrown to the position indicated in Fig. 2 which connects the winding 6 to the line circuit through the transformer with the phases in proper relation with respect to the phases of the stator winding 5. This results in an instantaneous polarity of the rotor winding with respect to the stator producing a retarding effect upon the rotor whereby slowing it down and bringing the rotor to a standstill. Due to the connections at 7, 8 and 9 the rotating fields of both stator and rotor will be in the same direction and the polarity of these windings will be such as to produce a magnetic locking or braking effect between the stator and rotor which will tend substantially to hold the rotor stationary. To reverse the rotor the switch 11 is opened and the switch 12 thrown to connect the resistance 13 to the winding 6 after which the switch 11 may be thrown in the reverse direction. The step-down transformer is employed for the purpose of reducing the voltage applied to the winding 6 which is usually a winding of comparatively low resistance and would be unduly heated if the full line voltage is applied thereto.

Figure 3:
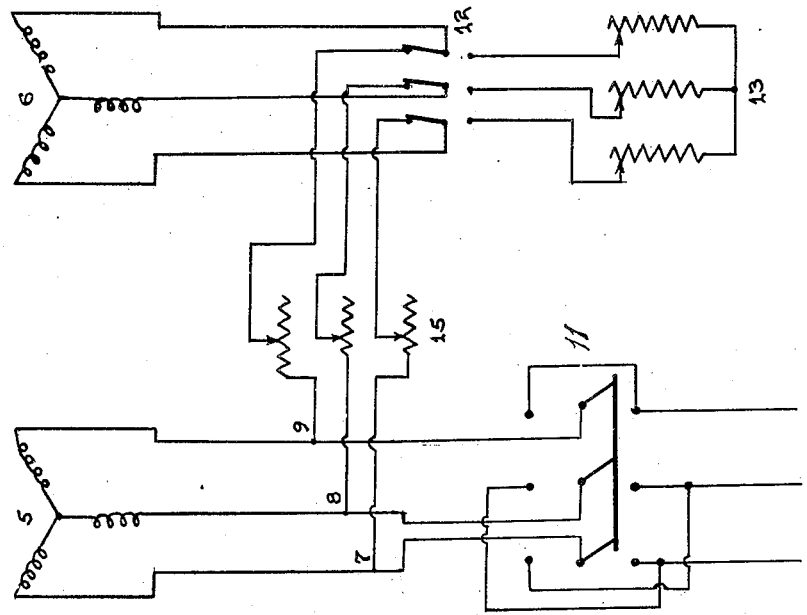
Fig. 3 shows a diagram similar to that of Fig. 2 in which a resistance is connected between the line circuit and the secondary winding for a purpose similar to the step-down transformer of Fig. 2.

Fig. 3 is a diagram similar to Fig. 2 and the system shown therein has substantially the same operating characteristics. In this figure a resistance 15 or a choke coil is substituted for the step-down transformer 14 of Fig. 2 in order to reduce the line voltage to the amount found desirable for application to the rotor winding 6 during the braking period.

Figure 1:
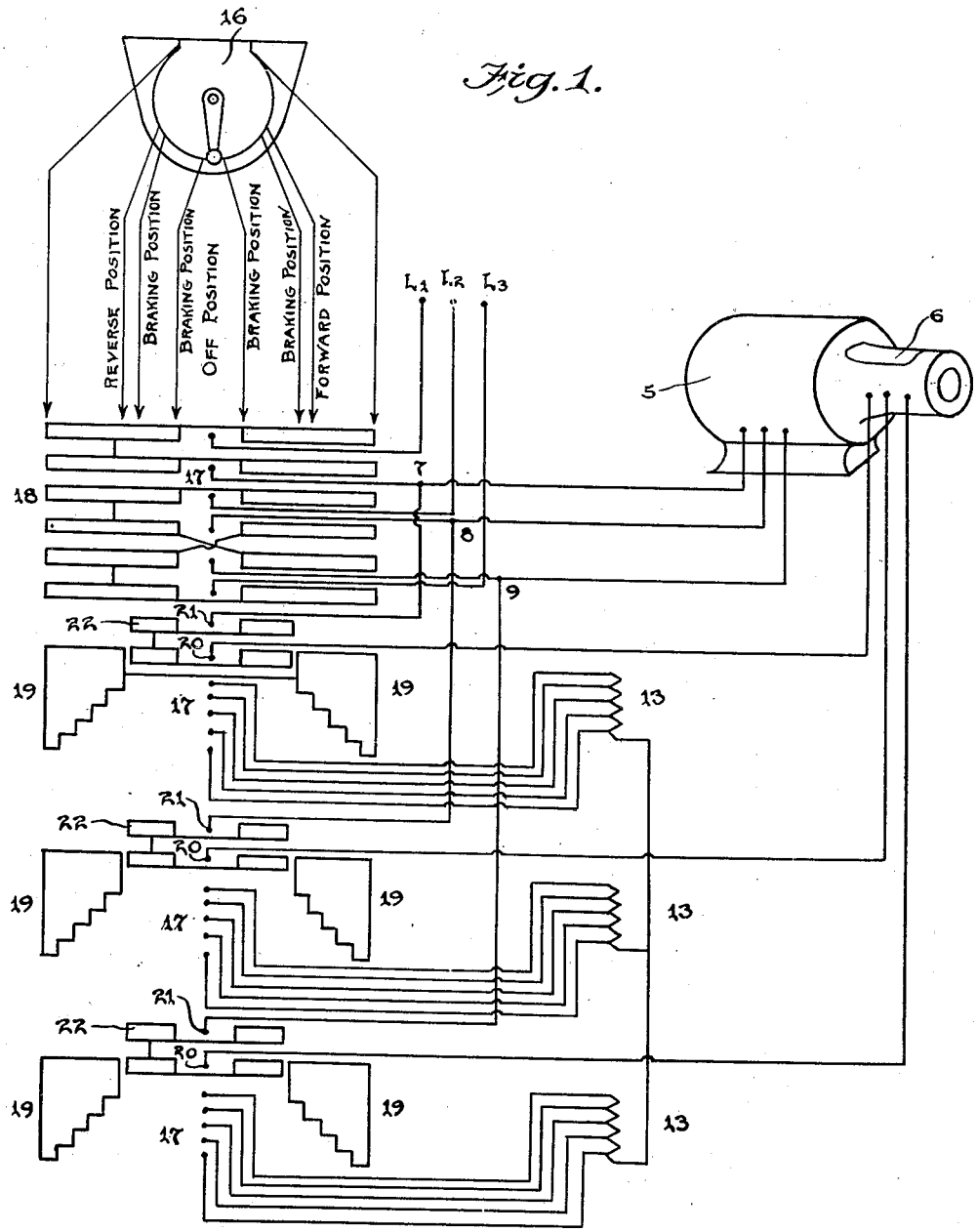
Fig. 1 is a circuit diagram of the motor provided with a controller for starting, accelerating and braking the motor in both directions of rotation.
Figure 5:
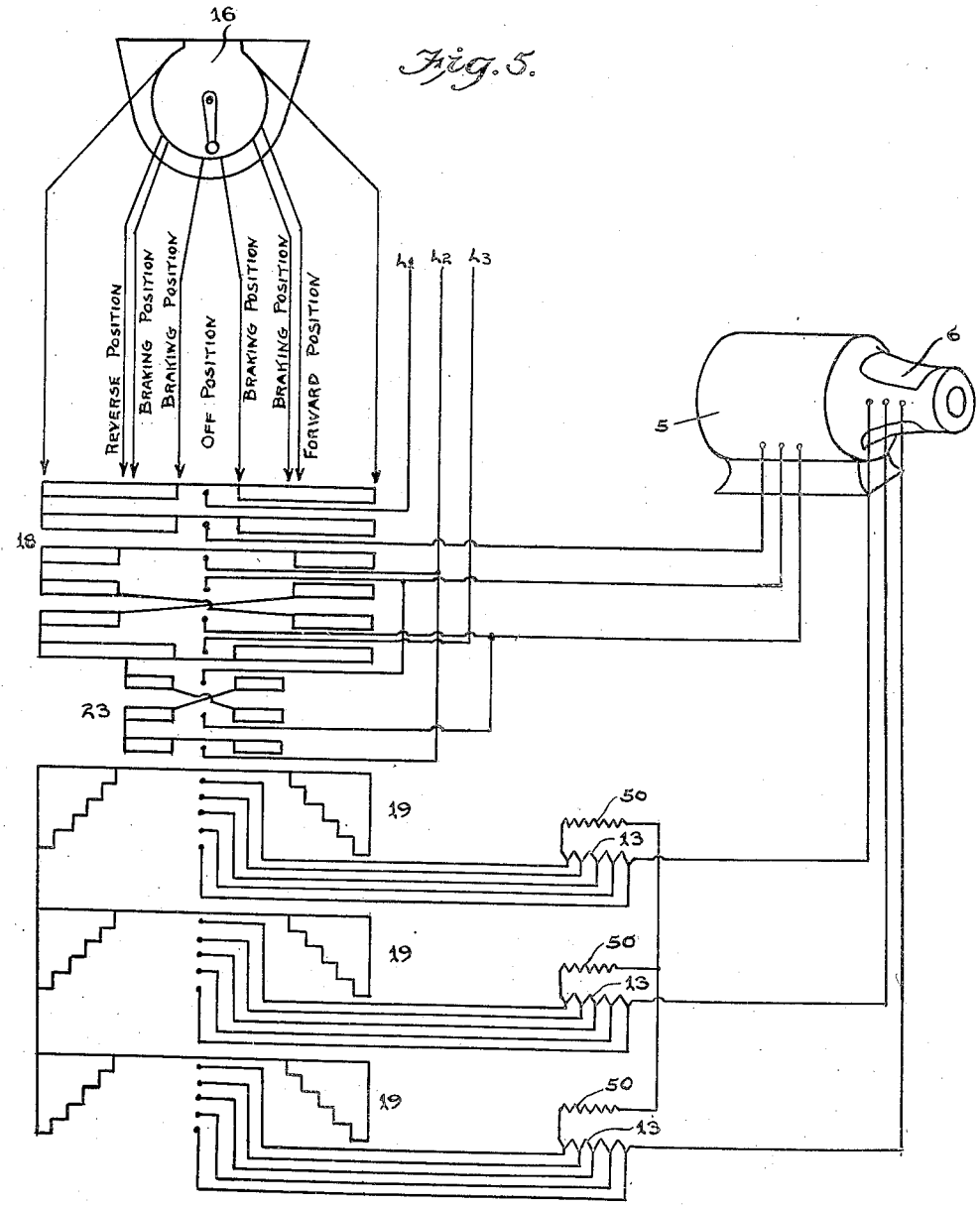
Fig. 5 is a circuit diagram similar to Fig. 1 showing a controller for starting, stopping and reversing and also for controlling the high resistance in the secondary winding as indicated in Fig. 4.

Fig. 1 is a diagram showing a polyphase wound rotor induction motor of the character referred to above and a controller for starting, braking, and reversing the same. A top plan view of controller is shown at 16 having its several positions with respect to the stationary contact 17 indicated by legends. The upper set of contacts 18 control the stator winding 5 for operation in either direction. The contacts 19 control the secondary resistance 13 of the rotor winding 6. The phases of the rotor are connected to the stationary contacts 20. The points 7, 8 and 9 on the stator windings are connected to the stationary contacts 21, 21, 21 which cooperate respectively with the sets of control contacts 22, 22, 22 for connecting the rotor winding 6 to the line circuit in parallel with the stator winding 5 but in reversed phase relationship for braking purposes. From the above reference to Fig. 1 it will be apparent that the controller may be operated to connect the stator to the line circuit with the resistance 13 connected in the rotor circuit and that such resistance is gradually cut out upon movement of the controller until the motor attains its full normal speed. The first movement of the controller from its off position connects the rotor winding through contacts 20, 21, 22 to the stator winding and to the line circuit producing a polarized effect between the stator and rotor tending to hold the rotor stationary. Continued movement of the controller produces the accelerating effect previously referred to by gradually cutting out the secondary resistance 13. To stop the motor the controller is moved in the reverse direction gradually inserting the resistance 13 in the rotor circuit and then opening the rotor circuit and thereafter connecting the rotor windings to the line circuit in proper phase relationship with respect to the stator winding thereby producing a powerful braking effect which will slow down the motor to the stopping point and hold the same in that condition until the controller is moved to off position. This system is applied to motors operating for hoisting purposes or for operating on other loads requiring considerable dynamic braking effect to bring the motor to a standstill. Of course the usual mechanical brakes may be employed in addition to the dynamic braking effect produced by the control of the windings as referred to above. Movement of the controller in the reverse direction produces the same results as just described with the exception that the rotation of the motor is in the opposite direction. In connection with the description of Fig. 1 it may be noted that a step down transformer as indicated in Fig. 2, a resistance as indicated in Fig. 3 may be inserted in the rotor circuit between the points 7, 8 and 9 and the stationary contacts 21, 21, 21. This will produce the proper reduced voltage for application to the secondary winding in case the rotor winding does not have sufficient resistance to withstand the line voltage. Although the illustrations in Fig. 1 and in Fig. 5 show a drum controller the invention is not limited to a drum controller as any form of automatic control may be used.

It is known in the art that the more resistance inserted in the rotor circuit of a polyphase wound rotor induction motor the slower its speed. It is clear therefore that if sufficient resistance is inserted in the rotor circuit while the rotor is at a standstill and it is attempted to start the motor the rotor will not rotate. If the rotor is started from some external source in the direction of the rotating field in the stator the rotor will continue to rotate in that direction very slowly. The same resistance to turning a rotor so connected exists in both directions of rotation. Advantage of this characteristic is taken into account in the arrangement shown in Fig. 4 in which the stator 5 is connected to the line $L_1$, $L_2$, $L_3$ through the reversing switch 11 and the rotor winding 6 has the usual resistance 13 in its circuit and a resistance 150

Figure 4:
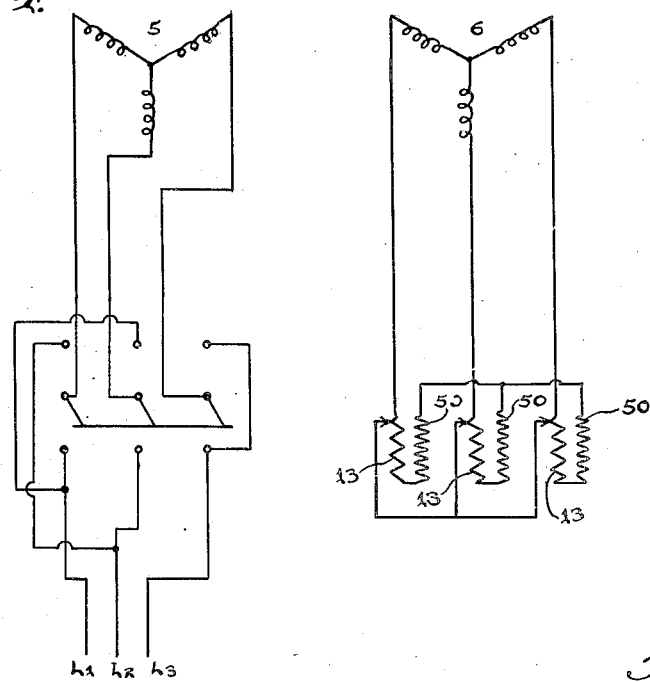
Fig. 4 is a diagram of a polyphase wound rotor induction motor having means for reversing the stator winding and also showing means for inserting a high resistance in the secondary winding for braking purposes.

50 in series therewith. The operation of this system is substantially as follows:

Upon closing the reversing switch 11 the stator winding will be energized and assuming the resistance 13 all in circuit the rotor will start up at low speed. The resistance 13 is then gradually short circuited until full speed of the rotor is attained. If, while the motor is running the switch 11 is reversed with the resistance 13 and 50 cut in the rotor circuit the rotating magnetic field in the stator will be reversed thereby slowing down and stopping the rotor. This braking effect is due in large part to high frequency currents induced in the rotor winding. The load on the rotor may have a tendency to continue to drive the rotor in the same direction while the reversed stator winding tends to reverse the motor. Due, however, to the large amount of resistance in the secondary circuit the motor will remain practically at standstill. Should it reverse, however the switch 11 can be thrown in the opposite direction which will have the effect of balancing the rotor against its load and hold the rotor stationary. The system of operation disclosed in Fig. 4 is illustrated in Fig. 5 in connection with the drum controller for performing the necessary operations. In this figure the controller contacts 18 constitute the main reversing switch for the windings of the stator 5. The controller contacts 23 constitute the auxiliary reversing switch for reversing the stator windings during the braking operation. The contacts 19 control the accelerating and retarding resistance 13 as well as the resistance 50 in the circuit of the rotor 6. Assuming the control lever moved to the left to the full forward position of the control which is controlling a hoist motor that is rotating in a clockwise direction to hoist a heavy load and that it is desired to stop the motor then the control lever is moved toward the braking position. As a result of this operation the resistance 13 is inserted in the rotor circuit which in turn slows down the speed of the motor and after the lever is moved completely into the braking position the auxiliary reversing switch 23 reverses the phases of the stator field and the resistance 50 together with the resistance 13 is brought into the motor circuit. The rotor will continue to rotate in the clockwise direction after the controller is in this position but with the rotating field of the stator traveling in the reverse direction which will slow down and stop the motor. After the motor is stopped the rotating stator field being in a counterclockwise direction will tend to drive the motor in that direction but because there is a high resistance in the rotor circuit the motor will not run in that direction and the load on the motor will tend to lower itself thereby tending to drive the motor in the anticlockwise direction which is the same direction as the magnetic field with the controller in the braking position indicated. Under these conditions the motor may continue to rotate in the same direction at very low speed but this can be overcome by moving the controller past the "off position" and into the other braking position which will again reverse the stator winding thereby tending to drive the motor in the original hoisting direction, but due to the high resistance in the rotor circuit the rotor will not run but will tend to keep the load from lowering itself.

Figure 6:
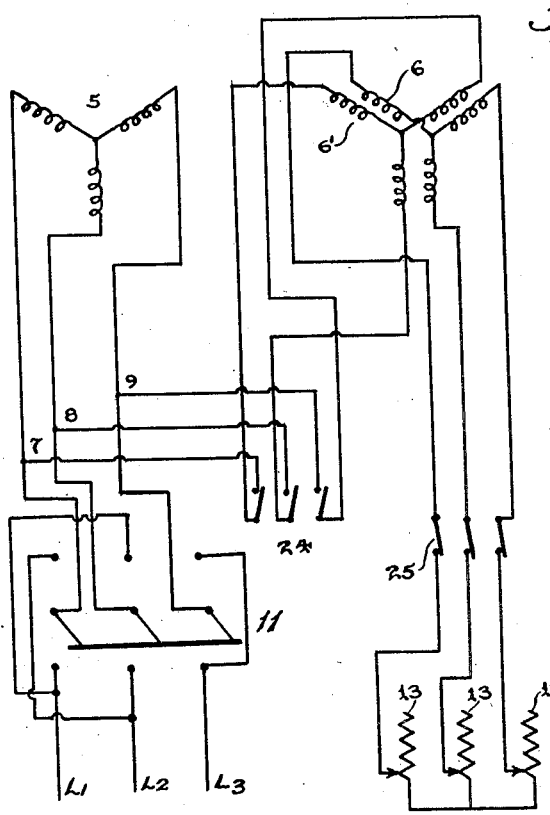
Fig. 6 is a diagram of a motor control system of the type referred to in which the rotor is provided with two windings one being the usual secondary winding connected to a resistance and the other a high resistance winding to be connected to the line circuit for braking purposes.

Referring to Fig. 6 the stator winding is shown at 5 connected to the line $L_1$, $L_2$, $L_3$ by reversing switch 11. The rotor comprises two windings 6 and 6' of which the winding 6' is of comparatively high resistance and is connected to the stator winding by means of switch 24 for braking purposes. The low resistance rotor winding 6 is connected to the slip resistance 13 by means of switch 25. The winding 6' is connected at 7, 8 and 9 between the stator winding 5 and the corresponding connection switch 11 similar to the corresponding connection in Figs. 2 and 3 so that when the switch 24 is closed the current in winding 6' will be in proper phase relation to that of winding 5. The normal operation of the system shown in Fig. 6 is to insert the resistance 13 in the rotor circuit with the switch 24 open and to close the reversing switch 11. The field winding 5 acting upon the low resistance rotor winding 6 causes the rotor to rotate and the resistance 13 is then gradually cut out of circuit. In order to slow down the motor the resistance 13 is reinserted, switch 25 opened and then switch 24 closed to energize winding 6' in the direction instantaneously opposite to that of the stator winding 5 thereby producing a powerful braking effect on the motor. The switch 25 may be opened and the two windings 5 and 6' being energized instantaneously in opposite directions will hold the rotor stationary.

Figure 7:
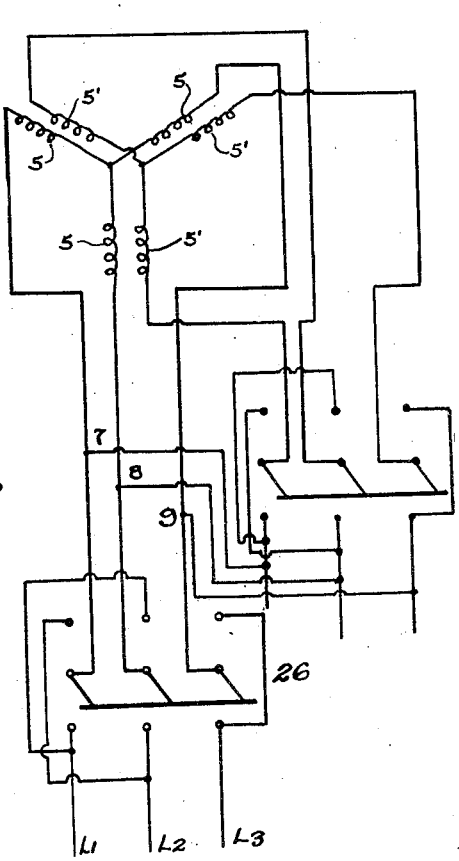
Fig. 7 is a diagram showing a motor provided with two stator windings to be connected in parallel for normal operation and one of which is to be reversed to produce a braking effect. The rotor winding is omitted in the diagram of Fig. 7.

Fig. 7 illustrates a motor control system in which the stator is provided with two windings 5 and 5' the winding 5 is connected to the line $L_1$, $L_2$, $L_3$ by means of reversing switch 11 while the winding 5' is connected through reversing switch 26 to points 7, 8 and 9 between the winding 5 and the reverse switch 11. From this arrangement it is apparent that both windings 5 and 5' are so connected as to be operated in parallel. Reversal of switch 11 will reverse both windings. Assuming the motor is running with switches 11 and 26 closed as shown in Fig. 7 and it is intended to stop the motor, switch 26 is thrown to its reversed position. This action causes a bucking magnetic field in the stator because winding 5' will be reversed with respect to winding 5. The two windings will therefore tend to neutralize certain phases, and cause an irregular polarity in the rotor and thus slow down the motor. In Fig. 7 a squirrel cage winding may be employed or any other type of secondary winding.

Figure 8:
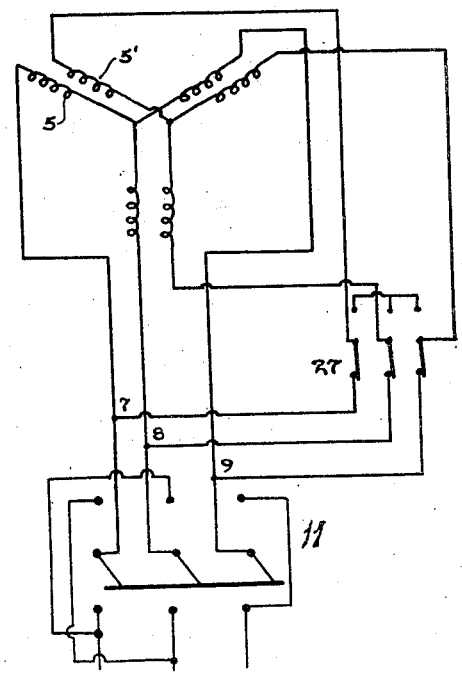
Fig. 8 shows a diagram having two stator windings similar to those shown in Fig. 7 and a switch for short-circuiting one of such windings to neutralize the rotating effect of the other winding during stopping. The rotor winding is omitted in this diagram.

Fig. 8 discloses a system somewhat similar to that of Fig. 7 in which the stator windings 5 and 5' may be connected in parallel when both switches 11 and 27 are closed in the position shown. The switch 27 when thrown to the reverse position short-circuits the stator winding 5' for braking service. This is due to the fact that when the winding 5' is short-circuited a current is induced therein in the opposite direction causing an irregular polarity on the rotor which is constantly repelled and as an effect tends to slow down the speed of the rotor. In the system of Fig. 8 a squirrel cage or wound rotor may be employed.

Figure 9:
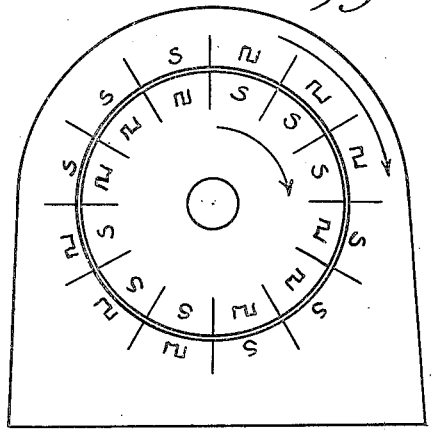
Figs. 9 and 10 illustrate the instantaneous polarity between the stator and rotor windings when the rotor is connected to the line circuit in reverse to the stator for braking purposes.
Figure 10:
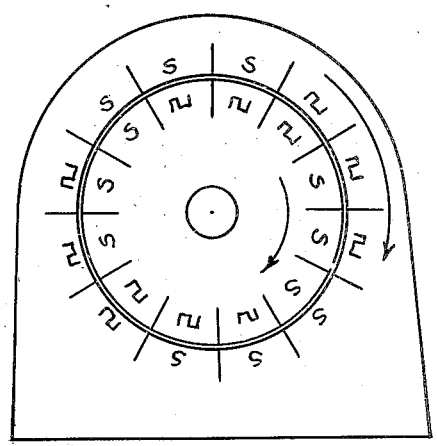

Figs. 9 and 10 illustrate the polarity of the stator and rotor when the phases of the rotor are in proper relationship with respect to the stator. This is of course an instantaneous action which changes with each cycle. Assuming a wound rotor having windings properly distributed with respect to those of the stator, the polarity of the different windings are properly represented in Fig. 9 for the holding effect and in Fig. 10 the braking or retarding position as the rotor with its rotating magnetic field tends to get ahead and slightly out of step with the polarity of the stator winding.

Having thus fully described my said invention, what I claim as new and desire to secure by Letters Patent is:

1. In a motor control system, in combination, a polyphase induction motor having a stator winding and a wound rotor, a slip resistance for the rotor circuit and a controller having a series of contacts for controlling the slip resistance and a set of contacts for connecting the rotor to the line circuit in proper phase relation to the stator winding to produce a braking action on the rotor and hold it stationary when stopped.

2. In a motor control system, in combination, a polyphase induction motor having a stator winding and a wound rotor winding of the same number of poles, a slip resistance for the rotor winding, a controller having contacts thereon for accelerating, braking and reversing the motor, the braking contacts serving to connect the rotor winding to the line circuit in instantaneous proper phase with relation to the stator field to produce a powerful braking action on the rotor.

3. In a motor control system, in combination, a polyphase induction motor having a stator winding and a wound rotor winding, a slip resistance for the rotor winding, and a drum controller having contacts thereon for reversing the motor and gradually cutting in and out the slip resistance for accelerating and decelerating the rotor, and additional contacts for connecting the rotor to the line, in slowing down, in reversed phase with respect to the stator winding to produce a braking effect on the rotor and to hold it stationary.

4. The method of controlling a polyphase induction motor having a stator winding, a rotor winding and a slip resistance for the rotor which comprises connecting the stator winding to a line circuit, gradually cutting the slip resistance in the rotor circuit during acceleration, reinserting said resistance in slowing down and in opening the rotor circuit and connecting the rotor winding to the line circuit in proper phase relation to the stator circuit to produce a powerful braking action on the rotor.

5. The method of controlling a polyphase induction motor having a stator winding, a wound rotor winding and a slip resistance for the rotor winding which comprises cutting in the slip resistance in slowing down the motor and connecting the motor windings to the line circuit in proper phase relation to produce a powerful braking effect on the rotor.

6. The method of controlling a polyphase induction motor having a wound stator winding, a rotor winding and a slip resistance, which consists in cutting the resistance into the rotor circuit in slowing down and then opening the rotor circuit and connecting it to the line circuit through a voltage reducing means, in proper phase relation to the stator winding for braking the rotor and holding the rotor stationary.

7. In a motor control system, in combination, a polyphase induction motor having a stator winding, and a wound rotor winding, a slip resistance and a braking resistance for the rotor circuit, and a controller having contacts and connections for controlling the slip resistance during acceleration and deceleration of the motor and for reversing the stator circuit to stop the motor, said controller also having connections for inserting said resistances in series in the rotor circuit to prevent the rotor from turning.

8. The method of controlling a polyphase induction motor having a stator and a wound rotor which consists in inserting a resistance in the rotor circuit to slow down the motor, in reversing the stator to produce a strong braking effect, and then inserting a high resistance in the rotor circuit and again reversing the stator circuit so that the rotor will tend to run in the original direction.

9. In a motor control system, a polyphase induction motor having a stator winding and a pair of wound rotor windings and a slip resistance for one of said rotor windings, means for connecting the stator winding to the line circuit and the resistance in circuit with its rotor winding for normal operation, and means for connecting the other rotor winding to the line circuit in proper phase relation to the stator winding for braking purposes.

10. In a control system, in combination, a polyphase induction motor having a stator winding and a wound rotor having a low resistance winding and a high resistance winding, a slip resistance for the low resistance winding, and means for connecting the stator winding to the line circuit and the slip resistance to the low resistance winding for normal operation, means for connecting the rotor high resistance winding to the line circuit in proper phase relation to the stator winding for braking purposes.

VICTOR DUDICK.